US012523704B2

(12) United States Patent
Ito et al.

(10) Patent No.: US 12,523,704 B2
(45) Date of Patent: Jan. 13, 2026

(54) LEAD-ACID BATTERY MONITORING APPARATUS AND LEAD-ACID BATTERY MONITORING METHOD

(71) Applicant: GS Yuasa International Ltd., Kyoto (JP)

(72) Inventors: Hirokazu Ito, Kyoto (JP); Hiroaki Sone, Kyoto (JP); Yuya Kihira, Kyoto (JP); Kazuo Haruki, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 689 days.

(21) Appl. No.: 17/433,181

(22) PCT Filed: Jun. 10, 2019

(86) PCT No.: PCT/JP2019/022874
§ 371 (c)(1),
(2) Date: Aug. 23, 2021

(87) PCT Pub. No.: WO2020/174710
PCT Pub. Date: Sep. 3, 2020

(65) Prior Publication Data
US 2022/0137142 A1     May 5, 2022

(30) Foreign Application Priority Data
Feb. 26, 2019   (JP) .................. 2019-033376

(51) Int. Cl.
*G01R 31/379*     (2019.01)
(52) U.S. Cl.
CPC .................. *G01R 31/379* (2019.01)

(58) Field of Classification Search
CPC .................................................. G01R 31/379
See application file for complete search history.

(56) References Cited

U.S. PATENT DOCUMENTS

| | | | | |
|---|---|---|---|---|
| 5,250,904 A | * | 10/1993 | Salander | H02J 7/0048 |
| | | | | 340/636.11 |
| 2016/0233560 A1 | | 8/2016 | Kanoh et al. | |
| 2017/0134833 A1 | | 5/2017 | Serizawa et al. | |
| 2017/0149101 A1 | | 5/2017 | Sakabe | |
| 2017/0331162 A1 | * | 11/2017 | Clarke | H02J 7/007192 |
| 2017/0350946 A1 | | 12/2017 | Mukaitani et al. | |

(Continued)

FOREIGN PATENT DOCUMENTS

| | | |
|---|---|---|
| JP | H03-240200 A | 10/1991 |
| JP | H08-128771 A | 5/1996 |

(Continued)

OTHER PUBLICATIONS

International Search Report (ISR) (PCT Form PCT/ISA/210), in PCT/JP2019/022874, dated Aug. 27, 2019.

*Primary Examiner* — Matthew T Martin
*Assistant Examiner* — Jared Hansen
(74) *Attorney, Agent, or Firm* — McGinn I.P.Law Group, PLLC

(57) ABSTRACT

A lead-acid battery monitoring apparatus includes: sensor units attached to lead-acid batteries connected in series and/or in parallel; and a control unit capable of wireless communication connection with the sensor units. The control unit receives a setting as to whether to prohibit or permit alarm output for each of the lead-acid batteries.

17 Claims, 4 Drawing Sheets

(56) References Cited

U.S. PATENT DOCUMENTS

| | | | | |
|---|---|---|---|---|
| 2018/0375371 A1* | 12/2018 | Duhaut | ................... | B60L 58/10 |
| 2019/0067758 A1* | 2/2019 | Yamada | .................... | H02J 7/00 |
| 2019/0094311 A1 | 3/2019 | Yamada | | |
| 2019/0113582 A1* | 4/2019 | Chen | ................... | G01R 31/367 |

FOREIGN PATENT DOCUMENTS

| | | | |
|---|---|---|---|
| JP | 2002-350275 | A | 12/2002 |
| JP | 2015-042022 | A | 3/2015 |
| JP | 2015-181327 | A | 10/2015 |
| JP | WO 2016/072487 | A1 | 5/2016 |
| JP | WO2015/181866 | A1 | 4/2017 |
| JP | WO2016/006048 | A1 | 4/2017 |
| JP | 6135767 | B2 | 5/2017 |
| JP | 2017-215276 | A | 12/2017 |

\* cited by examiner

System configuration

LEAD-ACID BATTERY MONITORING APPARATUS AND LEAD-ACID BATTERY MONITORING METHOD

TECHNICAL FIELD

The present invention relates to a lead-acid battery monitoring apparatus and a lead-acid battery monitoring method.

BACKGROUND ART

Patent Document 1 discloses an energy storage system and a maintenance method for the energy storage system. Patent Document 1 describes, "in the present embodiment, in terms of a down time of a storage battery group which otherwise is caused by monitoring of a storage battery, maintenance work for the storage battery can be performed while the other storage battery group is continued to be operated by using a mask function. In particular, concerning a large-scale energy storage system, which is provided with a large number of lithium ion secondary batteries as well as a monitoring function therefor and assumed to be used in a non-emergency situation, it is possible to perform maintenance work in the operating state of the storage battery group.".

PRIOR ART DOCUMENT

Patent Document

Patent Document 1: Japanese Patent No. 6135767

SUMMARY OF THE INVENTION

Problems to be Solved by the Invention

One aspect of the present invention provides a monitoring technique suitable for monitoring a lead-acid battery.

Means for Solving the Problems

A lead-acid battery monitoring apparatus according to one aspect of the present invention includes: sensor units attached to lead-acid batteries connected in series and/or in parallel; and a control unit capable of wireless communication connection with the sensor units. The control unit receives a setting as to whether to prohibit or permit alarm output for each of the lead-acid batteries.

A lead-acid battery monitoring method according to another aspect of the present invention includes: monitoring lead-acid batteries by using sensor units attached to the lead-acid batteries connected in series and/or in parallel; acquiring monitoring data by using a control unit capable of wireless communication connection with the sensor units; and receiving a setting as to whether to prohibit or permit alarm output for each of the lead-acid batteries, by using the control unit.

Advantages of the Invention

A lead-acid battery monitoring apparatus according to one aspect of the present invention receives a setting as to whether to prohibit or permit alarm output for each of lead-acid batteries. Thus, an energy storage system including the plurality of lead-acid batteries and the lead-acid battery monitoring apparatus can be operated with high reliability. In addition, a user can use the energy storage system more comfortably.

MODE FOR CARRYING OUT THE INVENTION

Figure 1:
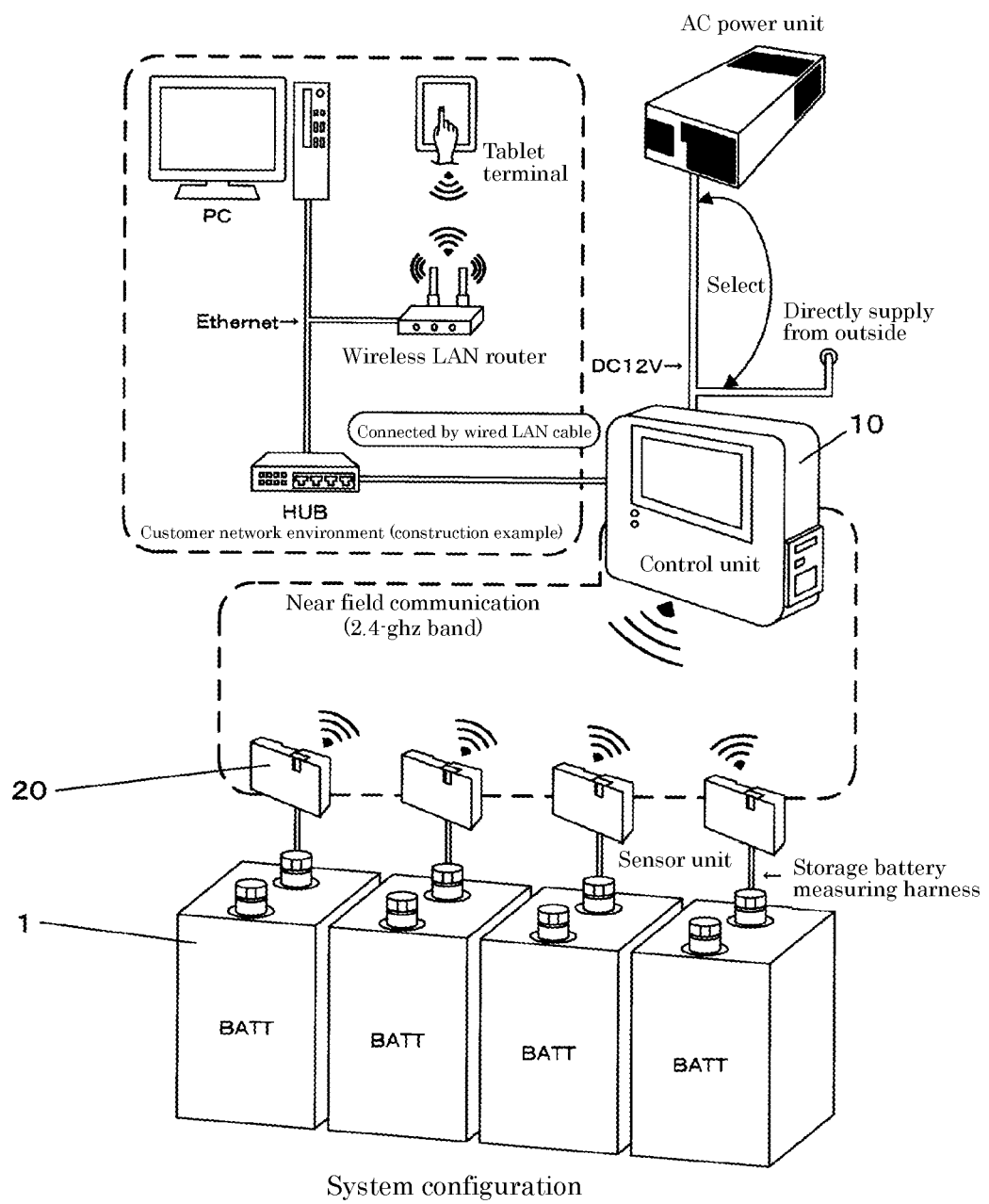
FIG. 1 is a view illustrating an outline of a lead-acid battery monitoring apparatus.

An energy storage system including a plurality of lead-acid batteries connected in series and/or in parallel and a lead-acid battery monitoring apparatus has been used conventionally. A conventional lead-acid battery monitoring apparatus outputs an alarm at the point when an abnormality state is recognized in one or some of the lead-acid batteries. Once the alarm is output from the monitoring apparatus, even when an abnormality occurs in another lead-acid battery or peripheral equipment, the user or a maintenance person of the energy storage system cannot recognize the abnormality until the alarm is released. In addition, the state where the alarm is being output is uncomfortable for the user of the energy storage system. Even when the user contacts the maintenance person, the maintenance person does not necessarily rush to the user immediately.

The present inventors have focused on high stability of a lead-acid battery. The lead-acid battery can continue charge and discharge for a predetermined time even when some voltage abnormality or internal resistance abnormality is recognized. In other words, even when charge and discharge are not stopped immediately after detection of an abnormality, the lead-acid battery does not immediately come into an unsafe state. Therefore, the present inventors have devised a concept of receiving a setting as to whether to prohibit or permit alarm output, corresponding to each of lead-acid batteries.

By receiving the setting as to whether to prohibit or permit alarm output, corresponding to each of the lead-acid batteries, it is possible to stop the alarm in haste on a case-by-case basis. Thus, when an abnormality occurs in another lead-acid battery or peripheral equipment, a new alarm is output, and the new abnormal part can be recognized. Therefore, the energy storage system can be operated with high reliability. In addition, it is possible to cancel a state where the alarm continues to be output for the abnormal part which the user has grasped by the alarm. Thus, the user can use the energy storage system more comfortably.

The control unit may receive a setting as to whether to prohibit or permit alarm output from a terminal device, which is network-connected to the control unit.

The control unit may include a touch panel display. A reception screen for receiving the setting as to whether to prohibit or permit alarm output for each of the lead-acid batteries may be displayed on the touch panel display.

The reception screen may receive a selection of a bank and a selection of a number of a lead-acid battery in the bank to set whether to prohibit or permit alarm output for a specific lead-acid battery.

The control unit may receive a setting as to whether to prohibit or permit alarm output for each of monitoring items of a voltage of the lead-acid battery and internal resistance of the lead-acid battery, for each of the lead-acid batteries.

With such a configuration, it is possible to set the alarm output more finely while grasping the occurring event.

The control unit may receive a setting as to whether to prohibit or permit alarm output for a temperature of the lead-acid battery, for each of the lead-acid batteries. Alternatively, the control unit may receive a setting as to whether to prohibit or permit alarm output for a communication state between the sensor unit and the control unit, for each of the lead-acid batteries. Alternatively, the control unit may receive a setting as to whether to prohibit or permit alarm output for the sensor unit, for each of the lead-acid batteries.

With such a configuration, because there is no abnormality in the lead-acid battery when there is a temperature abnormality (environmental temperature abnormality), a communication abnormality, or an abnormality in the sensor unit, it is possible to determine to take a different measure from when there is an abnormality in the lead-acid battery.

Hereinafter, an embodiment of a lead-acid battery monitoring apparatus will be described with reference to the drawings. As illustrated in FIG. 1, the lead-acid battery monitoring apparatus includes: sensor units 20 attached respectively to lead-acid batteries 1 connected in series and/or in parallel; and a control unit 10 capable of wireless communication connection with the sensor units 20. As will be described later, the control unit 10 receives a setting as to whether to prohibit or permit alarm output, corresponding to each of the lead-acid batteries 1 (the sensor units 20).

Here, the plurality of lead-acid batteries 1 connected in series are referred to as a bank. Instead of the bank, the lead-acid batteries 1 may be referred to as a string.

The control unit 10 may receive the setting by using a network-connected computer (PC) or tablet terminal.

Figure 2:
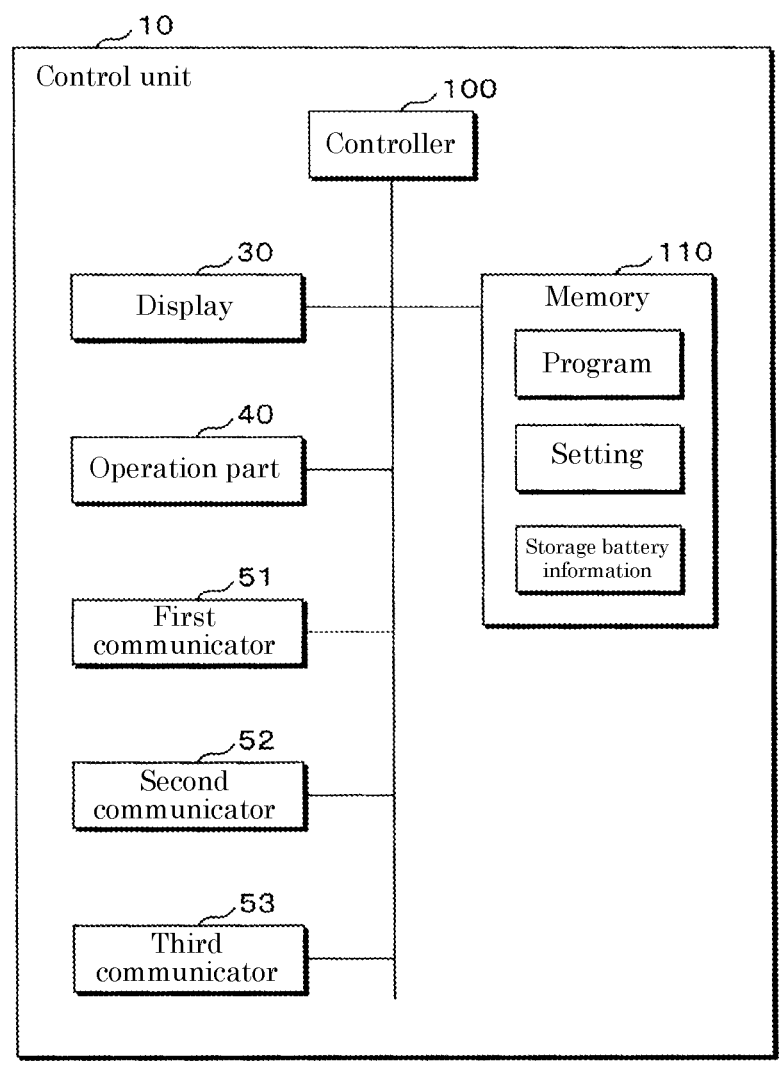
FIG. 2 is a block diagram of the lead-acid battery monitoring apparatus.

FIG. 2 is a block diagram illustrating a configuration of the control unit 10. The control unit 10 includes a controller 100, a memory 110, a display 30, an operation part 40, a first communicator 51, a second communicator 52, and a third communicator 53.

The controller 100 includes a processor and controls the display 30, the operation part 40, the first communicator 51, the second communicator 52, and the third communicator 53 on the basis of a program stored in the memory 110.

The memory 110 uses a nonvolatile memory. The memory 110 stores a program in advance. The memory 110 stores contents set by an operation on a menu screen to be described later. The memory 110 stores storage battery information acquired by the controller 100.

The display 30 is, for example, a liquid crystal panel. The operation part 40 is a touch panel built in the liquid crystal panel. The operation part 40 may include a physical button.

The first communicator 51 is a wireless communication module that realizes wireless communication connection with the sensor unit 20. The control unit 10 is communicably connected to the plurality of sensor units 20 by the first communicator 51. The second communicator 52 is a connection module for connecting to a customer's network illustrated in FIG. 1 and is, for example, a network card corresponding to a wired local area network (LAN). The third communicator 53 is a communication module that enables communication connection with a network-connected computer (PC) or tablet terminal. The third communicator 53 is, for example, a universal serial bus (USB).

In the control unit 10 configured as described above, it is possible to receive the setting for the alarm output on the menu screen shown in the display 30.

Figure 3:
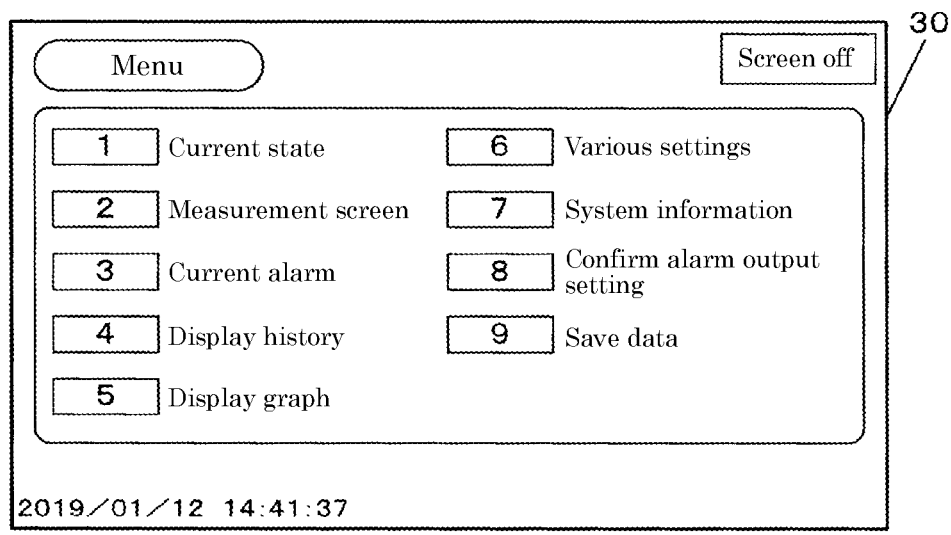
FIG. 3 is a view illustrating a menu screen of the lead-acid battery monitoring apparatus.

FIG. 3 illustrates the menu screen displayed on the display 30. The menu screen has displays (icons) such as "1. Current state", "2. Measurement screen", "3. Current alarm", "4. Display history", "5. Display graph", "6. Various settings", "7. System information", "8. Confirm alarm output setting", and "9. Save data". The menu screen may have a display (icon) of "Screen OFF".

When "6. Various settings" in FIG. 3 is selected, the screen shifts to a screen for various settings illustrated in FIG. 4. This screen has displays (icons) such as "1. Current time setting", "2. Display language setting", "3. Graph setting", "4. External output signal setting", "5. Measurement start time setting" "6. Alarm output setting", "7. Clear history", "8. Change password", and "9. Installation setting".

Figure 4:
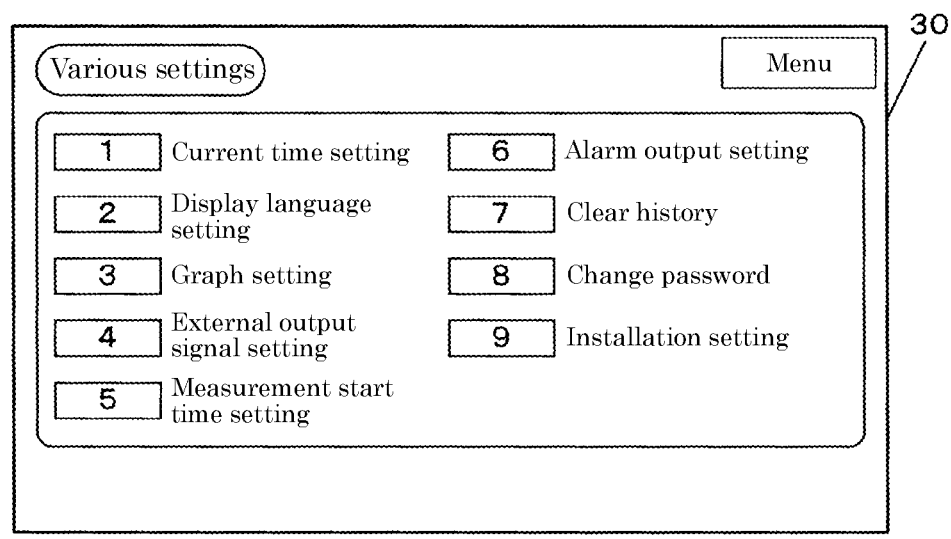
FIG. 4 is a view illustrating a screen for various settings of the lead-acid battery monitoring apparatus.
Figure 5:
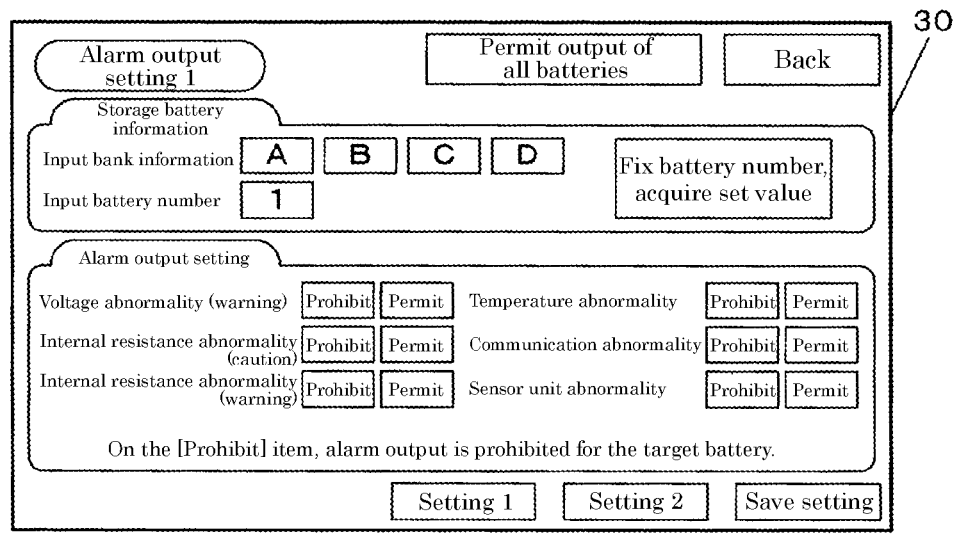
FIG. 5 is a view illustrating a screen of an alarm output setting of the lead-acid battery monitoring apparatus.

When "6. Alarm output setting" in FIG. 4 is selected, the screen shifts to a screen of alarm output setting illustrated in FIG. 5. This screen is a screen of "Alarm output setting 1" displayed when "Setting 1" is selected among "Setting 1", "Setting 2", and "Save setting" in the lower part of the display 30. The screen of "Alarm output setting 1" includes a "Storage battery information" column and an "Alarm output setting" column.

In the "Storage battery information" column, a bank A, a bank B, a bank C, and a bank D can be selected in the bank information input column. A predetermined lead-acid battery (a lead-acid battery of a predetermined number) among lead-acid batteries connected in series included in the selected bank can be selected in a battery-number input column.

In the "Alarm output setting" column, whether to prohibit or permit alarm output is received for each of "Voltage abnormality (warning)", "Internal resistance abnormality (caution)", "Internal resistance abnormality (warning)", "Temperature abnormality", "Communication abnormality", and "Sensor unit abnormality".

Figure 6:
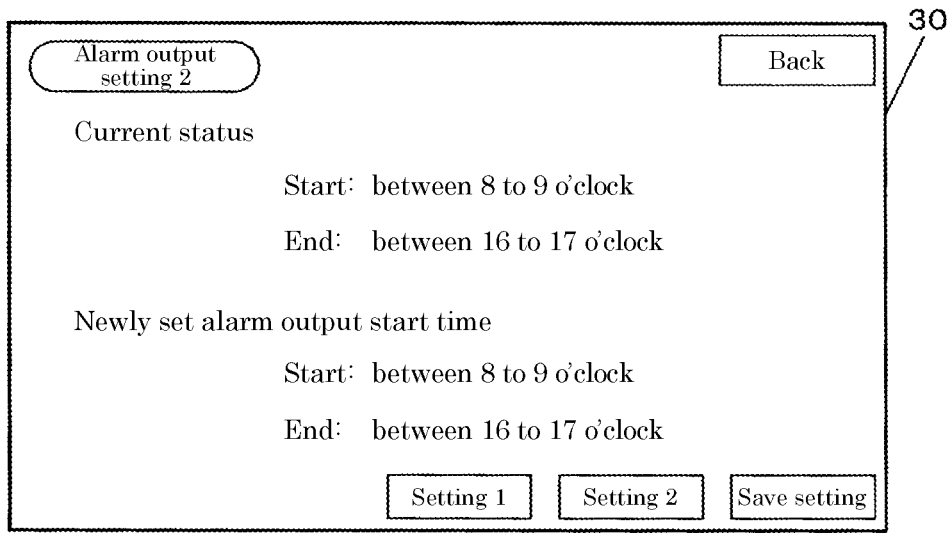
FIG. 6 is a view illustrating a screen of an alarm output setting of the lead-acid battery monitoring apparatus.

When "Setting 2" in the lower part of the display 30 is selected, the screen shifts to a screen of "Alarm output setting 2" illustrated in FIG. 6. On this screen, a start time and an end time of the alarm output can be set. On this screen, for example, the alarm output may be set to be permitted only in a time zone in which the user or the maintenance person can monitor the energy storage system.

According to the lead-acid battery monitoring apparatus of the present embodiment, a setting as to whether to prohibit or permit alarm output is received for each of lead-acid batteries 1. As a result, the user can more comfortably use the energy storage system including the plurality of lead-acid batteries 1 and the lead-acid battery monitoring apparatus. Specifically, the user or the maintenance person can stop the alarm in haste on a case-by-case basis. In addition, the operation down time of the energy storage system can be shortened or avoided.

The control unit 10 includes the touch panel display 30, and the touch panel display 30 displays a reception screen for receiving a setting as to whether to prohibit or permit alarm output for each of the lead-acid batteries 1. Accordingly, the operability by the user or the maintenance person can be improved.

The control unit 10 receives a setting as to whether to prohibit or permit alarm output for each of monitoring items of the voltage of the lead-acid battery 1 and the internal resistance of the lead-acid battery 1, for each of the lead-acid batteries. Hence, it is possible to set the alarm output more finely while grasping the occurring event.

The control unit 10 receives a setting as to whether to prohibit or permit alarm output for the temperature of the lead-acid battery 1 (a temperature detected by a temperature sensor installed in the vicinity of the lead-acid battery 1), for each of the lead-acid batteries 1. The control unit 10 receives a setting as to whether to prohibit or permit alarm output for a communication state between the sensor unit 20 and the control unit 10, for each of the lead-acid batteries 1. The control unit 10 receives a setting as to whether to prohibit or permit alarm output for an abnormality of the sensor unit 20 itself, for each of the lead-acid batteries 1. As a result, because there is no abnormality in the lead-acid battery 1 when there is a temperature abnormality, a communication abnormality, or an abnormality in the sensor unit 20, it is possible to determine to take a different measure from when there is an abnormality in the lead-acid battery.

The above-described embodiments are examples, and the present invention is not limited thereto. As described above, the control unit receives a setting as to whether to prohibit or permit alarm output for each of the lead-acid batteries. At that time, it is not always necessary to select a bank.

DESCRIPTION OF REFERENCE SIGNS

1: lead-acid battery
10: control unit
20: sensor unit
30: display

The invention claimed is:

1. A lead-acid battery monitoring apparatus comprising:
sensor units attached to lead-acid batteries connected in series and/or in parallel; and
a control unit configured for wireless communication connection with the sensor units,
wherein the control unit receives a setting, for each of a plurality of different type of abnormality indicators, as to whether to prohibit or permit alarm output, corresponding for each of the lead-acid batteries, and
wherein the control unit stops the alarm output according to the received setting corresponding for each of the lead-acid batteries even when a lead-acid battery from among the lead-acid batteries, which caused the alarm output, is continued to be operated.

2. The lead-acid battery monitoring apparatus according to claim 1, wherein the control unit receives a setting as to whether to prohibit or permit alarm output from a terminal device, which is network-connected to the control unit, for each of the lead-acid batteries.

3. The lead-acid battery monitoring apparatus according to claim 1, wherein
the control unit includes a touch panel display, and
the touch panel display displays a reception screen for receiving a setting as to whether to prohibit or permit alarm output for each of the lead-acid batteries.

4. The lead-acid battery monitoring apparatus according to claim 1, wherein the control unit receives a setting as to whether to prohibit or permit alarm output for each of monitoring items of a voltage of the lead-acid battery and internal resistance of the lead-acid battery, for each of the lead-acid batteries.

5. The lead-acid battery monitoring apparatus according to claim 1, wherein the control unit receives a setting as to whether to prohibit or permit alarm output for a temperature of the lead-acid battery, for each of the lead-acid batteries.

6. The lead-acid battery monitoring apparatus according to claim 1, wherein the control unit receives a setting as to whether to prohibit or permit alarm output for a communication state between the sensor unit and the control unit, for each of the lead-acid batteries.

7. The lead-acid battery monitoring apparatus according to claim 1, wherein the control unit receives a setting as to whether to prohibit or permit alarm output for an abnormality of the sensor unit, for each of the lead-acid batteries.

8. The lead-acid battery monitoring apparatus according to claim 1, wherein the control unit receives a start time and an end time of the alarm output.

9. The lead-acid battery monitoring apparatus according to claim 1, wherein the alarm output is set to be permitted in a predetermined time window.

10. The lead-acid battery monitoring apparatus according to claim 1, wherein the alarm is set to be permitted only in a time zone in which the lead-acid batteries are monitored.

11. The lead-acid battery monitoring apparatus according to claim 1, wherein the lead-acid battery continues to charge and discharge for a predetermined time even when voltage abnormality or internal resistance abnormality is recognized with the alarm output.

12. The lead-acid battery monitoring apparatus according to claim 1, wherein the control unit stops the alarm output according to the received setting even when the lead-acid battery from among the lead-acid batteries, which caused the alarm output, is continued to be operated for a predetermined period of time.

13. The lead-acid battery monitoring apparatus according to claim 1, wherein the control unit receives the setting through a network.

14. The lead-acid battery monitoring apparatus according to claim 1, wherein the control unit is in wireless connection with a sensor unit of the sensor units through a communicator.

15. The lead-acid battery monitoring apparatus according to claim 1, wherein the control unit comprises:
a controller including a processor;
a memory storing a program executable by the controller, contents set by an operation on a menu screen, and information of each of the lead-acid batteries acquired by the controller; and
a display controlled by the controller to display the menu screen.

16. The lead-acid battery monitoring apparatus according to claim 1, wherein the setting for the alarm output is configured individually for each of the plurality of different type of abnormality indicators comprising a voltage abnormality warning, an internal resistance abnormality caution, an internal resistance abnormality warning, a temperature abnormality, a communication abnormality, and a sensor unit abnormality.

17. The lead-acid battery monitoring apparatus according to claim 1, wherein the control unit receives the setting as to a time period of when to prohibit or permit alarm output for each of the plurality of different type of abnormality indicators, corresponding for each of the lead-acid batteries, and
wherein the setting is received via a network connected device.

* * * * *